United States Patent [19]

Atsumi et al.

[11] 4,418,898
[45] Dec. 6, 1983

[54] CUSHIONED MOUNTING DEVICE WITH A MASS MEMBER FORMING A SUB-OSCILLATION SYSTEM AND MEANS FOR RESTRICTING CUSHIONING MOVEMENT

[75] Inventors: Tomiaki Atsumi; Kazumasa Kuse; Junji Deto, all of Toyota, Japan

[73] Assignee: Toyota Jidosha Kabushiki Kaisha, Toyota, Japan

[21] Appl. No.: 281,779

[22] Filed: Jul. 9, 1981

[51] Int. Cl.³ .......................... B60G 11/22; F16F 1/36
[52] U.S. Cl. ............................. 267/63 R; 267/141.1; 267/153
[58] Field of Search .................. 267/57.1 R, 57.1 A, 267/63 R, 63 A, 150, 152, 153, 134, 135, 136, 140.4, 140.3, 141, 141.1, 141.2, 141.7, 141.3, 141.4, 141.5, 140.1, 140.2, 140.5, 22 R; 188/379, 378, 380; 248/634, 635, 560, 583, 580, 605, 609, 614, 630, 632

[56] References Cited

U.S. PATENT DOCUMENTS

| | | | |
|---|---|---|---|
| 1,822,026 | 9/1931 | Guy | 267/63 R X |
| 2,079,798 | 5/1973 | Geyer | 267/141.4 |
| 2,508,139 | 5/1950 | Binney | 248/634 X |
| 2,678,796 | 5/1954 | Roy | 267/141 X |
| 2,702,703 | 2/1955 | Franceschetti | 267/63 R |
| 2,739,821 | 3/1956 | Hickman | 267/63 A X |
| 2,758,832 | 8/1956 | Hickman | 267/63 A |
| 3,430,901 | 3/1969 | Cauvin | 248/632 X |
| 3,722,939 | 3/1973 | Church et al. | 267/63 A X |
| 4,032,125 | 6/1977 | Minakawa et al. | 267/63 A |

FOREIGN PATENT DOCUMENTS

| | | | |
|---|---|---|---|
| 1186899 | 2/1965 | Fed. Rep. of Germany | 267/63 A |
| 266723 | 2/1950 | Italy | 267/63 A |
| 1061930 | 3/1967 | United Kingdom | 267/141.1 |

Primary Examiner—Douglas C. Butler
Attorney, Agent, or Firm—Stevens, Davis, Miller & Mosher

[57] ABSTRACT

A cushioned mounting device for use in mounting an engine to the body of a vehicle such as an automobile, having first and second frame members arranged to oppose to each other, a mass member having a plate portion and disposed between the first and the second frame members, a first cushion member disposed between and flexibly connecting together the first frame member and the mass member, and a second cushion member disposed between and flexibly connecting together the second frame member and the mass member, wherein the mass member, together with the first and the second cushion members, forms a sub-oscillation system which can provide less than one transmission ratio relative to an oscillation system supposed to be composed of the engine supported by this cushioned mounting device and the first and the second cushion members which can also provide less than one transmission ratio, whereby the cushioned mounted device cna provide a low overall transmission ratio which is substantially the multiplication of the above two less than one transmission ratio.

4 Claims, 3 Drawing Figures

CUSHIONED MOUNTING DEVICE WITH A MASS MEMBER FORMING A SUB-OSCILLATION SYSTEM AND MEANS FOR RESTRICTING CUSHIONING MOVEMENT

BACKGROUND OF THE INVENTION

The present invention relates to a cushioned mounting device, and more particularly, to a cushioned mounting device for use in mounting an engine to the body of a vehicle such as an automobile.

An engine for an automobile is mounted to the body of an automobile by means of a cushioned mounting device which generally comprises a first frame member fastened to the casing of the engine, a second frame member fastened to the body of the automobile, and a cushion member made of an elastomeric material and provided between and flexibly connecting the first frame member and the second frame member. In this engine mounting structure, as well known in the art, if the spring constant of the cushion member is relatively small, i.e., if the cushion member is relatively soft, although vibration of the engine due to its operation and having a relatively high frequency is well absorbed by the cushion member and transmission of engine vibration from the engine to the vehicle body is effectively interrupted, supporting of the engine becomes unstable and swaying of the engine with a large amplitude is liable to occur when, for example, the automobile is running on a rough ground. Such a large swaying of the engine deteriorates drive feeling of the automobile and would even cause damaging of the engine or the body or the both. On the other hand, if the spring constant of the cushion member is relatively large, i.e., if the cushion member is relatively hard, although supporting of the engine becomes stable and engine swaying is suppressed to a small amplitude, engine vibration is not sufficiently absorbed by the cushion member and drive feeling is also deteriorated, because the natural frequency of the engine support system becomes high and gets closer to the frequency of the exciting force generated in the engine. These two mutually discrepant requirements for the spring constant or softness/hardness of the cushion member has heretofore made designing of the cushioned engine mounting device troublesome and often unsatisfactory.

SUMMARY OF THE INVENTION

It is therefore the primary object of the present invention to provide a cushioned mounting device which is suitable for use in mounting an engine in an automobile body and which provides good supporting stability with a relatively high spring constant of a cushion member incorporated therein and nevertheless ensures good interruption of transmission of engine vibration.

Another object of the present invention is to provide a cushioned mounting device having the abovementioned improved performances by a simple and inexpensive structure.

Still another object of the present invention is to provide a cushioned mounting device having the abovementioned improved performances by a strong and durable structure.

According to the present invention, these and other objects are accomplished by a cushioned mounting device comprising a first frame member having a first face portion, a second frame member having a second face portion, said first and said second frame members being arranged relative to each other in such a manner that said first and said second face portions are opposed to each other, a mass member having a plate portion disposed between said first face portion of said first frame member and said second face portion of said second frame member, a first cushion member made of an elastomeric material and provided between said first face portion of said first frame member and said plate portion of said mass member and flexibly connecting said first frame member and said mass member, and a second cushion member made of an elastomeric material and provided between said second face portion of said second frame member and said plate portion of said mass member and flexibly connecting said second frame member and said mass member.

In a cushioned mounting device of the abovementioned structure, the mass member and the first and the second cushion members provided at the opposite sides of the mass member constitute a sub-oscillation system having its own particular natural frequency and incorporated at a middle portion of a main oscillation system composed of a main mass which is the engine to be supported by this cushioned mounting device and a main cushion member which is a series combination of the first and the second cushion members. In this case, the main mass, i.e. the engine, of the main oscillation system shows rapidly lowering responsiveness to the exciting force applied thereto as the frequency of the exciting force becomes larger beyond the natural frequency of the main oscillation system, and similarly the mass member of the sub-oscillation system shows rapidly lowering responsiveness to the exciting force applied thereto, i.e. oscillation of the main oscillation system, as the frequency of the main oscillation system becomes larger beyond the natural frequency of the sub-oscillation system.

In this connection, the natural frequency of the sub-oscillation system is generally larger than that of the main oscillation system, because the natural frequency of the main and the sub-oscillation systems are proportional to the square root of the spring constant of the cushion members acting thereon and inversely proportional to the square root of the mass concerned, i.e. the mass or the engine of that of the mass member, and because the mass of the engine is much larger than that of the mass member. Further, the value of the transmission ratio, which itself is well known in the art of oscillation and shows the ratio of the force transmitted through an oscillation system to the exciting force applied to the oscillation system, with respect to the main oscillation system becomes less than one when the frequency of the exciting force exceeds 2½ times of the natural frequency of the main oscillation system, and similarly the value of the transmission ratio with respect to the sub-oscillation becomes less than one when the frequency of the exciting force exceeds 2½ times of the natural frequency of the sub-oscillation system.

Therefore, if the spring constant of the first and the second cushion members and the weight of the mass member are properly adjusted relative to the weight of the engine and the frequency of the exciting force generated in the engine during its normal operation, so that the frequency of said exciting force is larger than 2½ times of the natural frequency of the sub-oscillation system, the transmission ratio of the sub-oscillation system in normal to high speed operation of the engine becomes smaller than the transmission ratio of the main oscillation system. This means, in other words, that the cushioned mounting device according to the present invention can provide better engine vibration interrupting performance than the conventional cushioned mounting device, in normal to high speed operation of the engine, by virtue of such a relatively simple modification of the structure of the conventional cushioned mounting device that a single cushion member is divided into two and a mass member is interposed therebetween.

According to a particular feature of the present invention, the first and/or the second frame member may be made of a plate material to have a substantially flat central portion which provides said face portion and a flange portion extending therefrom. By this structure, the first and/or the second frame member can have a firm and rigid structure even when it is made of a relatively thin plate of steel or the like, wherein the substantially flat central portion which provides said face portion for connection with the cushion member and bears the load applied thereto is reinforced by the flange portion which may extend substantially perpendicularly to the central portion. According to a modification of the present invention, the flange portion may be formed all around the central portion of the first and/or the second frame member so as to provide an annular flange portion.

Further, this flange portion formed at the edge portion of the first and/or the second frame member can be effectively utilized as a means for limiting shearing deformation caused in the first and/or the second cushion member. In view of improving durability of a cushioned mounting device having the abovementioned structure, it is desirable that the shearing deformation of the first and/or the second cushion member should be limited within a proper range which ensures highly elastic deformation of the elastomeric material. Such a limitation on the shearing deformation of the first and/or the second cushion member is positively obtained by making the flange portions of the first and the second frame member abut against one another, or by further providing a flange portion on the mass member and by making the flange portion of the first and/or the second frame member abut against the flange portion of the mass member.

In order to make the abutting between the flange portions shockless and soundless, according to another feature of the present invention, the flange portion of the first and/or the second frame member may be covered with a layer of an elastomeric material. Such a layer of an elastomeric material may be formed integrally with the first or the second cushion member.

The first and the second cushion members may desirably be bonded to the first and the second frame members respectively and to the mass member by vulcanization.

The flange member provided at a peripheral edge portion of the mass member or at one of the first and the second frame members can operate as a heat insulator which protects the first and/or the second cushion member made of an elastomeric material and the covering layer formed on the flange portion of the first and/or the second frame member and also made of an elastomeric material from heat radiation from the engine casing.

BRIEF DESCRIPTION OF THE DRAWINGS

The present invention will be more clearly understood from the detailed description given hereinbelow and the accompanying drawings with respect to some preferred embodiments thereof, which are given by way of illustration only, and therefore do not restrict the present invention in any way, and wherein.

DESCRIPTION OF THE PREFERRED EMBODIMENTS

Figure 1:
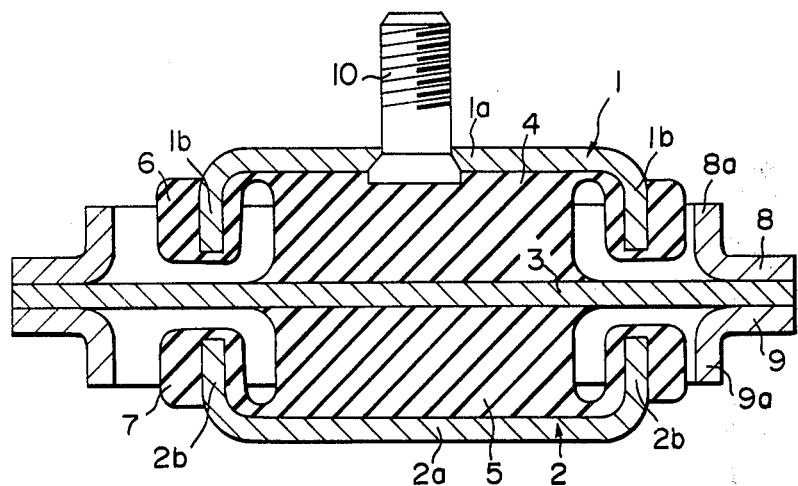
FIGS. 1, 2 and 3 are axial sectional views of three embodiments of the cushioned mounting device according to the present invention.

Referring first to FIG. 1 which shows a first embodiment of the present invention, reference numerals 1 and 2 designate a first frame member and a second frame member, respectively. The first frame member 1 in this embodiment has a plane central portion 1a and substantially symmetrical flange portions 1b extending integrally from two opposite end portions of the central portion 1a, which in this embodiment has a rectangular plane shape, to be substantially perpendicular to the plane central portion 1a. Similarly, the second frame member 2 has a plane central portion 2a and substantially symmetrical flange portions 2b extending integrally from two opposite end portions of the plane central portion 2a, which has also a rectangular plane shape, to be substantially perpendicular to the plane central portion 2a. These two frame members are arranged relative to each other in such a manner that a first face portion which is the inner surface portion of the central portion 1a of the first frame member 1 and a second face portion which is the inner surface portion of the central portion 2a of the second frame member 2 are positioned substantially in parallel and opposite to each other.

Between the first frame member 1 and the second frame member 2 there is disposed a mass member 3 which, in this embodiment, is a rectangular plane plate having a plane contour larger than the first and the second frame members so as to present peripheral portions extending outward from the gaps formed between the confronting edges of the flange portions 1b and 2b.

A first cushion member 4 made of an elastomeric material is provided between the central portion 1a of the first frame member 1 and the mass member 3 so as to flexibly to connect these two members. Similarly a second cushion member 5 made of an elastomeric material is provided between the central portion 2a of the second frame member 2 and the mass member 3 so as to flexibly connect these two members. The end portions of the cushion member 4 on its one end closer to the first frame member 1 are extended over the inside surfaces of the flange portions 1b and further over the outside surfaces of the flange portions 1b by turning around the tip edge portions of the flange portions 1b, thereby providing side cushions 6 on the outside surfaces of the flange portions 1b. Similarly, the end portions of the second cushion member 5 on its one end closer to the second frame member 2 are extended over the inside surfaces of the flange portions 2b and further over the outside surfaces of the flange portions 2b by turning around the tip edge portions of the flange portions 2b, thereby providing side cushions 7 on the outside surfaces of the flange portions 2b. These cushion members are bonded to the first and the second frame members and the mass member by vulcanization.

Along the peripheral portion of the mass member 3 which extends outwardly from the annular gap formed between the edge portions of the flange portions 1b and 2b, actually between the mutually opposing elastomeric covering layers formed around the tip edge portions of the flange portions 1b and 2b, there are provided as attached to the opposite sides thereof annular flange members 8 and 9 having annular flange portions 8a and 9a, respectively. These annular flange portions 8a and 9a oppose the flange portions 1b and 2b with interposition of the side cushions 6 and 7, respectively. The flange members 8 and 9 may be fixed to the mass member 3 by welding or any other proper fixing means.

The flange portions 1b operate as a means for limiting shearing deformation of the cushion member 4 which is caused by relative movement between the first frame member 1 and the mass member 3 in parallel to each other, by one of the flange portions 1b abutting against the annular flange portion 8a by way of the side cushion 6. Similarly, the flange portions 2b also operate as a means for limiting shearing deformation of the cushion member 5 which is caused by relative movement between the second frame member 2 and the mass member 3 in parallel to each other, by one of the flange portions 2b abutting against the annular flange portion 9a by way of the side cushion 7.

A bolt 10 mounted to the first frame member 1 is provided for the purpose of mounting this cushioned mounting device to an engine not shown in the figure.

Figure 2:
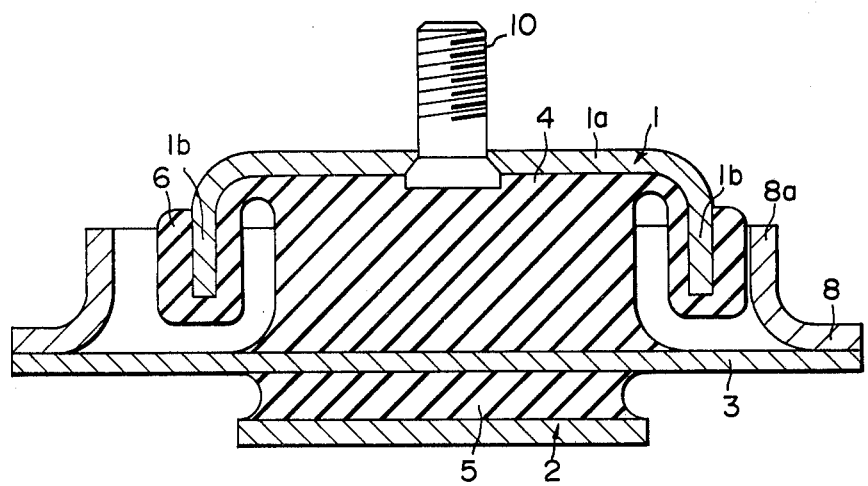

FIG. 2 shows a second embodiment of the cushioned mounting device according to the present invention. The upper half in the figure of this second embodiment is substantially the same as the upper half in the figure of the embodiment shown in FIG. 1. The parts in the embodiment shown in FIG. 2 which correspond to those in the embodiment shown in FIG. 1 are designated by the same reference numerals as used in FIG. 1. In this second embodiment, however, the second cushion member 5 is relatively thin as compared with the first cushion member 4 or the first and the second cushion members 4 and 5 in the embodiment shown in FIG. 1, and since this relatively thin cushion member 5 is less liable to damage by overshearing, it is omitted to provide any flange portions in the second frame member 2, by contrast to the second frame member 2 in the embodiment shown in FIG. 1. Therefore, this second embodiment is simpler in structure than the first embodiment shown in FIG. 1.

It is of course the matter of design to be based upon the particular conditions to which the cushioned mounting device of the present invention is subject which of the structures shown in FIG. 1 and FIG. 2 should be selected and how the data with regard to various structural components should be determined.

Figure 3:
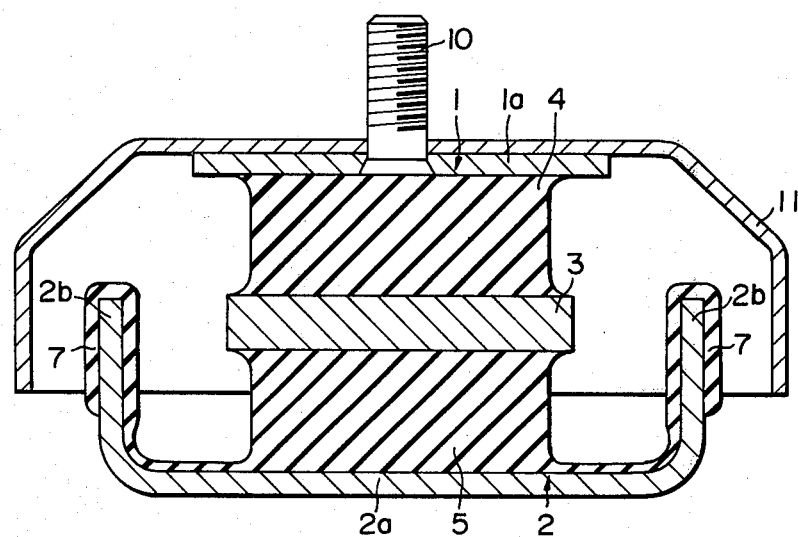

FIG. 3 shows a third embodiment of the cushioned mounting device according to present invention. This embodiment is somewhat different from the above described first and second embodiments in that the first frame member 1 includes an inversed bowl-like flange member 11 mounted over a plate member 1a which provides the central portion of the first frame member connected with one end of the first cushion member 4, and that the plane shaped mass member 3 is relatively small so as not to extend over the flange portions 2b of the second frame member 2 which has substantially the same structure as the second frame member 2 in the first embodiment shown in FIG. 1. In this embodiment, the portions corresponding to those shown in the embodiments of FIGS. 1 and 2 are designated by the same reference numerals. However, in view of the inventive concept of the present invention described above, it will be appreciated that the cushioned mounting device shown in FIG. 3 also embodies the essential concept of the present invention, and that this cushioned mounting device may be designed in the same manner as in the case of the first and the second embodiments shown in FIGS. 1 and 2, based upon the principle of the present invention described above.

Although the present invention has been shown and described with respect to some preferred embodiments thereof, it should be understood that various modifications, omissions and alterations could be made by one of ordinary skill in the art without departing from the scope of the invention.

We claim:
1. A cushioned mounting device, comprising:
a first frame member of an inversed bowl-like shape including a central flat portion and an annular side wall portion extending outwardly from said central flat portion therearound;
a second frame member of a substantially U-shaped cross section including a middle flat portion and two flange portions extending outwardly from opposite ends of said middle flat portion;
a flat plate mass member; and
a first and a second flat cushion member;
said first frame member, said second frame member, said flat plate mass member, said first cushion member and said second cushion member being so assembled together that said central flat portion of said first frame member and said middle flat portion of said second frame member are opposed to one another with interposition of a piled up assembly of said flat plate mass member and said first and second cushion members with said flat plate mass member being sandwiched between and bonded on opposite sides thereof with said first cushion member and said second cushion member, while said first and second cushion members are bonded with said central flat portion of said first frame member and said middle flat portion of said second frame member, respectively,
wherein said two flange portions of said second frame member are housed within said annular side wall portion of said first frame member so that each of said two flange portions of said second frame member opposes each adjacent inside surface portion of said annular side wall portion of said first frame member with each predetermined clearance left therebetween.

2. A cushioned mounting device according to claim 1, wherein said flange portions of said second frame member are provided with cushion layers on their outer and edge surfaces where they oppose said annular side wall portion of said first frame member.

3. A cushioned mounting device according to claim 2, wherein said cushion layers are formed as integrally extended portions of said second cushion member, said integrally extended portions being extended over inside surfaces of said flange portions of said second frame member.

4. A cushioned mounting device according to claim 1, in which said first and second cushion members are of approximately the same thickness and the flat plate mass member is approximately centered in the assembly so that a plane extended peripherally outwardly from said flat plate mass member would intersect both said flange portions and said annular side wall portion.

* * * * *